(12) United States Patent
Yokoyama et al.

(10) Patent No.: US 8,152,314 B2
(45) Date of Patent: Apr. 10, 2012

(54) DISPLAY DEVICE

(75) Inventors: Toshifumi Yokoyama, Osaka (JP);
Ken'ichi Kasazumi, Osaka (JP);
Shin-ichi Kadowaki, Hyogo (JP);
Kiminori Mizuuchi, Osaka (JP);
Hiroyuki Furuya, Nara (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1166 days.

(21) Appl. No.: 11/916,041

(22) PCT Filed: May 22, 2006

(86) PCT No.: PCT/JP2006/310172
§ 371 (c)(1),
(2), (4) Date: Nov. 30, 2007

(87) PCT Pub. No.: WO2006/129515
PCT Pub. Date: Dec. 7, 2006

(65) Prior Publication Data
US 2009/0051827 A1 Feb. 26, 2009

(30) Foreign Application Priority Data
May 31, 2005 (JP) .................... 2005-158702

(51) Int. Cl.
*G03B 21/00* (2006.01)

(52) U.S. Cl. ............ 353/122; 353/31; 353/69; 353/70; 353/44; 353/50; 353/66; 353/77; 353/79; 353/81; 353/98; 353/121; 372/8; 372/29.01; 372/29.014; 372/29.015; 372/38.1

(58) Field of Classification Search ............... 353/31, 353/69, 70, 101, 44, 50, 66, 77, 79, 81, 98, 353/121, 122; 348/766, 744, 750, 758, 759, 348/761–763, 768; 349/7, 8, 9, 12, 27, 33, 349/25; 345/690–694, 84–86; 372/8, 29.01, 372/29.014, 29.015, 38.1
See application file for complete search history.

(56) References Cited

U.S. PATENT DOCUMENTS 5,313,479 A   5/1994  Florence .................. 372/26
6,002,505 A  12/1999  Kraenert et al.
(Continued)

FOREIGN PATENT DOCUMENTS
JP         3-66365        3/1991
(Continued)

OTHER PUBLICATIONS

Japanese Office Action in corresponding Japanese Application No. 2007-518919 dated Aug. 9, 2011.

*Primary Examiner* — Georgia Y Epps
*Assistant Examiner* — Sultan Chowdhury
(74) *Attorney, Agent, or Firm* — Steptoe & Johnson LLP (57) ABSTRACT

A display device (100) of the present invention has a first switch (3) and a second switch (4) on an upper surface of its casing, and includes a control circuit (18) for controlling the first switch (3) and the second switch (4) and a light source (19) inside the casing. The control circuit (18) performs control so that the light source (19) is turned on when the second switch (4) is pressed after a predetermined period of time has passed from when the first switch (3) was pressed. Thereby, the display device (100) of the present invention prevents entering of a person into a projection area before projection of video, and controls inadvertent start-up.

18 Claims, 7 Drawing Sheets

U.S. PATENT DOCUMENTS

| | | | |
|---|---|---|---|
| 6,411,270 B1 * | 6/2002 | Ohsawa | 345/84 |
| 6,460,999 B1 * | 10/2002 | Suzuki | 353/79 |
| 6,661,820 B1 * | 12/2003 | Camilleri et al. | 372/38.09 |
| 7,224,335 B2 * | 5/2007 | Gibbon et al. | 345/84 |
| 7,753,531 B2 * | 7/2010 | Fujita et al. | 353/50 |
| 7,753,534 B2 * | 7/2010 | Kuno | 353/69 |
| 2001/0005262 A1 | 6/2001 | Tsurushima | 353/121 |
| 2005/0024339 A1 * | 2/2005 | Yamazaki et al. | 345/169 |

FOREIGN PATENT DOCUMENTS

| | | |
|---|---|---|
| JP | H3-40705 | 4/1991 |
| JP | 11-501419 | 2/1999 |
| JP | 2003-215562 | 7/2003 |
| JP | 2004-45548 | 2/2004 |

* cited by examiner

DISPLAY DEVICE

The present application is based on International Application PCT/JP2006/310172, filed May 22, 2006, which claims priority to Japanese Patent Application No. 2005-158702, filed May 31, 2005, the entire contents of which are hereby incorporated by reference.

TECHNICAL FIELD

The present invention relates to a display device for projecting video by emitting light.

BACKGROUND ART

Figure 8:
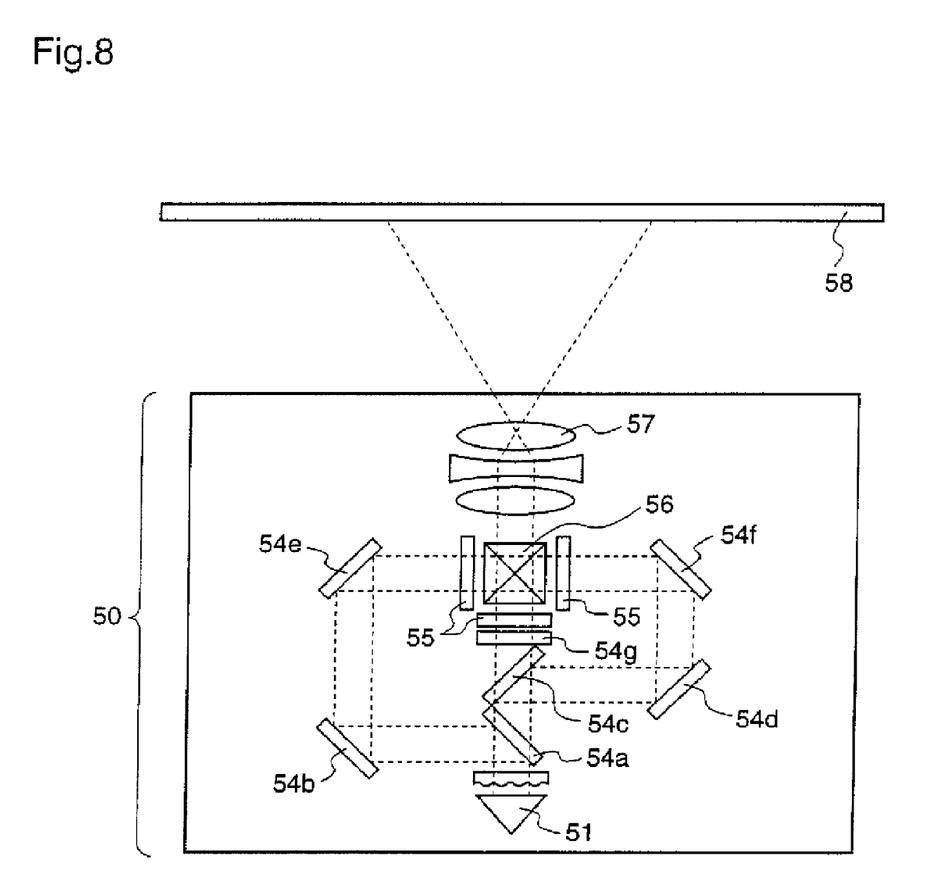
FIG. 8 is a schematic diagram illustrating a conventional display device.

Conventionally, a portable display device, a so-called liquid crystal projector, has been widely used (e.g., Patent Document 1). This display device projects light from a light source onto a screen, and viewers watch video projected on the screen. FIG. 8 is a diagram illustrating an example of a constitution of a conventional display device. In FIG. 8, a light source unit 50 of the display device comprises a lamp 51, optical filters 54a to 54g, a liquid crystal panel 55, a prism 56, and a lens 57. White light outputted from the lamp 51 is branched into red, green, and blue lights by the optical filters 54a to 54g. The red, green, and blue lights transmit through the liquid crystal panel 55, and are multiplexed by the prism 56. The multiplexed light is projected on the screen 58 through the lens 57, and displayed as video.

Figure 9:
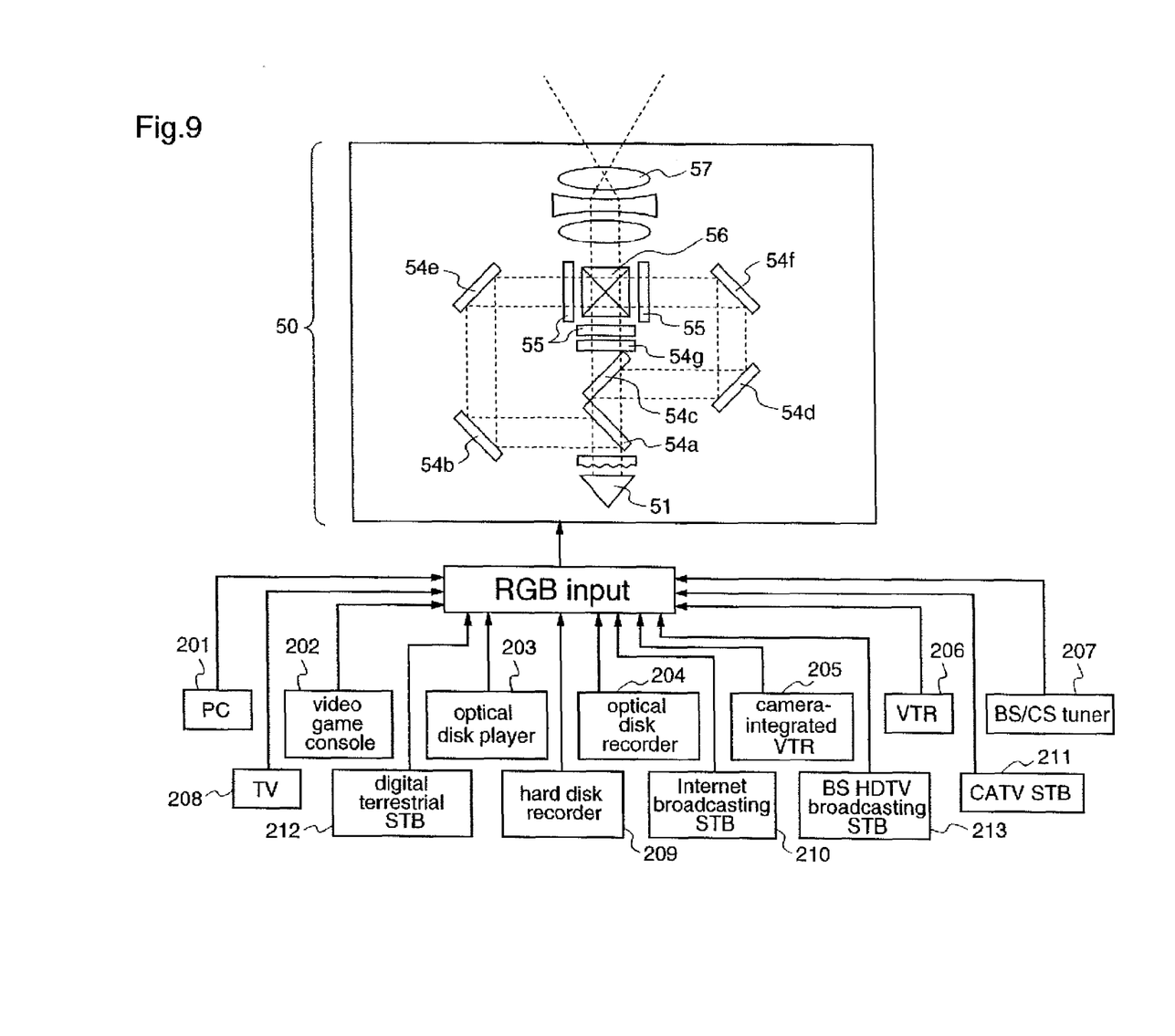
FIG. 9 is a diagram illustrating devices which can be connected to a conventional laser display.

FIG. 9 shows devices which can be connected to this conventional display device. In FIG. 9, the display device receives a video signal through an RGB terminal, and any device having an output terminal for an RGB signal can be connected to the display device, for example, a personal computer 201 such as a notebook PC, a video game console 202, an optical disc player 203 for various types of DVDs, an optical disk recorder 204 including a VTR-integrated recorder, a camera-integrated VTR 205, a stationary VTR 206, a BS/CS tuner 207, a TV 208, a hard disk recorder 209 including a recorder integrated with various types of optical disc drives, a STB (Set Top Box) for internet broadcasting 210, a STB for CATV 211, a STB for digital terrestrial broadcasting 212, and a STB for BS HDTV broadcasting 213.

Further, the display device may be provided with a D4 input terminal, a DVI-D input terminal, an IEEEE1394 terminal, a component terminal, an S terminal, a video terminal and the like, in accordance with the formats of signals outputted from the devices connected to the display device.

Meanwhile, there has conventionally been proposed a display device using coherent light, such as laser, as a light source instead of the above-mentioned lamp (e.g., Patent Document 2). When the light source is changed from the lamp to the laser, reduction in power consumption, longer operating life of the light source, improvement in color reproducibility, miniaturization of the optical system, and battery activation can be realized.

Patent Document 1: Japanese Published Patent Application No. 2003-215562 (FIG. 1)

Patent Document 2: Japanese Published Patent Application No. Hei. 6-208089

Problems to be Solved by the Invention

While a display device which has a function of detecting entering of a person in a video projection area and controlling a light source output has conventionally been proposed, a display device which has a function of preventing entering of a person into a video projection area before projection of video has not been proposed.

Therefore, the conventional display device has a possibility that a person might enter into a video projection area, and the person will directly see light emitted from a lamp or a laser as a light source and thereby feel dazzled and discomfort.

Further, while a portable display device has conventionally been proposed, a display device having a function of preventing inadvertent activation of the display device while it is being transported has not been proposed.

Therefore, when the display device is transported or taken out of a bag or the like, a start switch of the device might be inadvertently pressed, and projected light might be accidentally applied to a person, and thereby the person who is irradiated with the projected light feels dazzled and discomfort. Furthermore, if the display device is battery powered, the battery is unnecessarily consumed when the start switch is inadvertently pressed.

Accordingly, it is an object of the present invention to provide a display device which prevents entering of a person into a projection area before projection of video, and has a function of controlling inadvertent activation. Further, it is another object of the present invention to provide a display device which prevents a person who enters into a projection area from feeling extreme discomfort.

Measures to Solve the Problems

In order to solve the above-mentioned problems, according to the present invention, there is provided a display device for projecting video by emitting light, including a prevention means for controlling turn-on of a light source in the display device by two or more stages of switch control using a switch, thereby preventing entering of a person into a projection area before projection of video.

Further, the display device of the present invention includes a detection means for detecting entering of a person into the projection area, and a means for controlling an output of projected light when the detection means detects entering of a person into the projection area.

Further, the display device of the present invention includes a concave portion at an upper surface of a casing of the display device, and the switch is disposed in the concave portion.

Further, the display device of the present invention includes a shutter that covers the switch.

Further, in the display device of the present invention, the prevention means has a plurality of switches.

Further, in the display device of the present invention, the prevention means has a first switch and a second switch, and the light source is turned on when the second switch is pressed after a predetermined period of time has passed from when the first switch was pressed.

Further, in the display device of the present invention, the prevention means has one switch, and the light source is turned on when the switch is again pressed after a predetermined period of time has passed from when the switch was once pressed.

Further, in the display device of the present invention, the prevention means prevents entering of a person into the projection area by a two-stage switch control before projection of video, and displays a guidance including a display indicating the projection area and a warning display that urges confirmation of surrounding circumstances, on the screen on which video is projected, by a first switch control, and turns on the light source of the display device by a second switch control, after a predetermined period of time has passed from when the display of the guidance was ended.

Further, the display device of the present invention includes a two-dimensional spatial modulation element having plural cells, which modulates the light emitted from the light source by the plural cells, wherein the display indicating the projection area is performed by using the cells positioned in the vicinity of an outermost circumference of the two-dimensional spatial modulation element.

Further, in the display device of the present invention, an area indicated by the display indicating the projection area is larger than a projection area of video that is projected after execution of the second switch control.

Further, in the display device of the present invention, the guidance including the display indicating the projection area and the warning display is displayed using green light.

Further, in the display device of the present invention, a range of green of the green light is $X<0.3$, $Y \geq 0.6$ on a xy chromaticity diagram of CIE.

Further, in the display device of the present invention, the green light is coherent light, and its output is equal to or lower than class 2 of the laser safety standard that is defined by the International Electrotechnical Commission.

Further, in the display device of the present invention, the prevention means prevents entering of a person into the projection area by a two-stage switch control before projection of video, and performs an audio guidance warning to be cautious of video projection, by a first switch control, and turns on the light source of the display device by a second switch control after a predetermined period of time has passed from when the audio guidance was ended.

Further, in the display device of the present invention, the prevention means prevents entering of a person into the projection area by a two-stage switch control before projection of video, in which a hood is set in a position in the vicinity of a projection lens by a first switch control of the prevention means, and the light source of the display device is turned on by a second switch control of the prevention means after the hood is confirmed to have been set in a predetermined position.

Further, the display device of the present invention includes a hood attachment part to which a hood is detachably attached, which is disposed in the vicinity of a projection lens on an upper surface of a casing, and the light source of the display device is turned on by the switch control of the prevention means after the hood is confirmed to have been attached to the hood attachment part.

Further, in the display device of the present invention, the length of the hood in the projection direction is longer than a distance from the surface of the casing to a position where the beam density of the light emitted from the projection lens becomes maximum.

Effects of the Invention

The display device of the present invention is provided with the prevention means for controlling turn-on of the light source of the display device by two or more stages of switch control using a switch, thereby preventing entering of a person into a projection area before projection of video. Therefore, it is possible to prevent a person from feeling discomfort due to the projected light.

Further, the display device of the present invention has the concave portion on the upper surface of the casing, and the switch is disposed in the concave portion, and further, the switch is covered with the shutter. Therefore, erroneous irradiation of the projected light to a person is avoided, which is caused by that the switch is pressed inadvertently. Further, when the display device is battery-driven, unnecessary consumption of the battery is avoided, which is also caused by inadvertent pressing of the switch.

Furthermore, the display device of the present invention is provided with the hood disposed on the upper surface of the casing in the vicinity of the projection lens, and the length of the hood in the projection direction is longer than a distance from the surface of the casing to a position where the beam density of the light emitted from the projection lens becomes maximum. Therefore, even when a person enters into the projection area, it is prevented in advance to make the person feel discomfort.

DESCRIPTION OF THE REFERENCE NUMERALS

2 . . . screen
3, 4 . . . switch
5 . . . projection lens
6 . . . shutter
7 . . . beam frame
8 . . . warning indication
9 . . . red light source
10 . . . green light source
11 . . . blue light source
12 . . . lens
13 . . . light quantity equalizing device
14 . . . two-dimensional spatial modulation device
15 . . . multiplexing prism
16 . . . projection lens
17 . . . hood
18 . . . control circuit
19 . . . light source
20 . . . video projection area
21 . . . detection beam
22 . . . concave portion
23 . . . sensor
50 . . . light source unit
51 . . . lamp
54a-54g . . . optical filter
55 . . . liquid crystal panel
56 . . . prism
57 . . . lens 58 ... screen
100, 200 ... display device
201 ... personal computer
202 ... video game console
203 ... optical disc player
204 ... optical disc recorder
205 ... camera-integrated VTR
206 ... stationary VTR
207 ... BS/CS tuner
208 ... TV
209 ... hard disk recorder
210 ... STB for Internet broadcasting
211 ... STB for CATV
212 ... STB for digital terrestrial broadcasting
213 ... STB for BS HDTV

BEST MODE TO EXECUTE THE INVENTION

Hereinafter, embodiments of the present invention will be explained with reference to the drawings.

Embodiment 1

Figure 1:
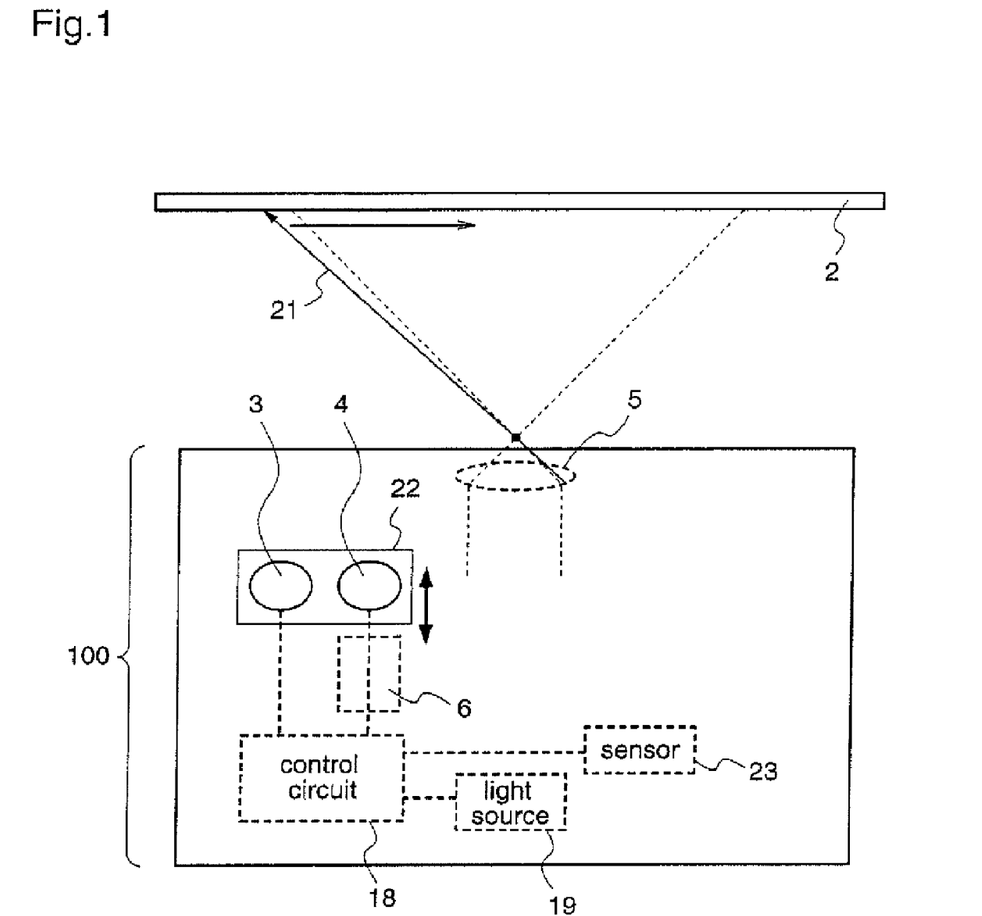
FIG. 1 is a top view of a display device according to a first embodiment.

FIG. 1 is a top view of a display device according to a first embodiment of the present invention.

A display device 100 according to the first embodiment has a first switch 3 and a second switch 4 that is a switch for turning on a light source, on an upper surface of its casing, and contains a control circuit 18 for controlling the whole display device, and a light source 19. The control circuit 18 prevents current from flowing into the light source 19 until a predetermined period of time passes from when the first switch 3 is pressed, even if the second switch 4 is pressed. When the second switch 4 is pressed after the predetermined period of time has passed from when the first switch 3 was pressed, the control circuit 18 makes current flow into the light source 19. Thereby, when the second switch 4 is pressed after the predetermined period of time has passed from when the first switch 3 was pressed, the light source 19 is turned on, whereby video is projected from a projection lens 5 onto a screen 2. Since the switch control at starting is thus performed in two stages, a period of time occurs from when the first switch is activated to when the second switch is activated, whereby a user can check the surrounding circumstances during this period.

Figure 2:
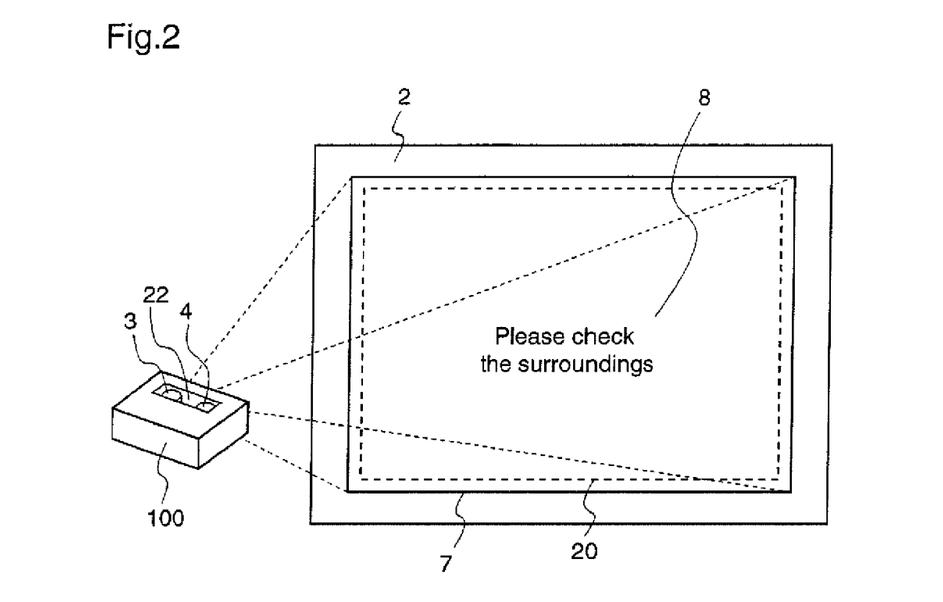
FIG. 2 is a diagram illustrating an example of a warning indication that is performed by the display device according to the first embodiment.
Figure 3:
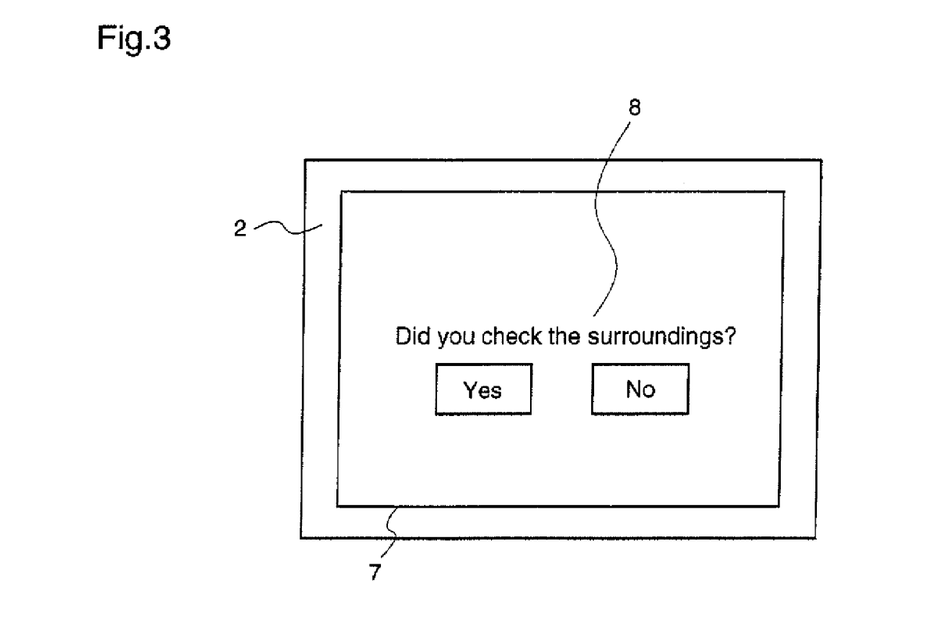
FIG. 3 is a diagram illustrating another example of a warning indication that is performed by the display device according to the first embodiment.

Further, in order to prevent entering of a person into a projection area, the display device 100 displays a guidance including a display indicating the projection area and a warning indication that urges confirmation of the surrounding circumstances, when the first switch 3 is pressed. FIG. 2 is a diagram illustrating an example of the guidance displayed by the display device 100.

When the first switch 3 is pressed, the display device 100 displays, on the screen 2, a guidance including a beam frame 7 indicating the projection area, and a warning indication 8 ("Please check the surroundings." in FIG. 2) that urges the user to check the surrounding circumstances. The area of the beam frame 7 is set larger than a video projection area 20. When a two-dimensional spatial modulation element (e.g., a liquid crystal element, a DMD or the like) having plural cells for modulating light from the light source 19 is used for video display, the beam frame 7 is displayed by using cells in the vicinity of the outermost circumference among the plural cells. The cells in the vicinity of the outermost circumference are cells disposed outside a range of cells to be used for video output. Therefore, a person who is outside the beam frame 7 is not irradiated with the projected light.

The brightness of the beam frame 7 and the warning indication 8 should be kept as low as possible within a level that can be visibly checked by the user or viewer. Preferably, a color to be used for irradiation of the beam frame 7 is green. In particular, green light having a wavelength of 510 nm-550 nm, or in a range of $X<0.3$, $Y\geq0.6$ in a CIE (1931 CIE chromaticity diagram) xy chromaticity diagram is preferable since the green light is highly visible to human eyes and thereby it is easily recognized even in low output power. Further, when using coherent light such as laser is used as the light source 19 of the display device 100, the brightness of the beam frame 7 and the warning indication 8 is desired to be equivalent to a light quantity that is equal to or lower than the class 2 of the laser safety standard defined in the International Standard IEC 825 by the International Electrotechnical Commission (IEC). By adopting the light quantity equal to or lower than the class 2, even when a person enters into the projection area, the degree of glare the person feels can be reduced.

As described above, when the guidance is displayed by the green light, the beam frame 7 and the warning indication 8 can be displayed by using the green light source for video projection, whereby a new light source for guidance display can be dispensed with.

When the second switch 4 is pressed after a predetermined period of time has passed from when the display of the beam frame 7 and the warning indication 8 was ended, the control circuit 18 makes current flow into the light source 19. Thereby, the light source 19 is turned on when the second switch 4 is pressed, and video is projected on the screen. By performing such two stages of switch control operations, the guidance including the beam frame 7 and the warning indication 8 is displayed, and the light source 19 is turned on after the predetermined period of time has passed from when the display of the guidance was ended, whereby the user or viewer can recognize the projection area before the video is projected, thereby preventing entering of a person into the projection area before projection of video. Further, since no current flows into the light source 19 even when the second switch 4 is pressed unless the predetermined period of time has passed after the display of the guidance was ended, a period of time during which the surrounding viewer can get out of the projection area is secured.

When the above-mentioned two stages of switch control operations have ended and the display device 100 is activated, the display device 100 detects a person who enters into the projection area by using a detection beam 21 shown in FIG. 1. The detection beam 21 is infrared light which is invisible to human eyes. When there is a person who enters into the projection area and the detection beam 21 is reflected by the person, the reflected light is detected by a sensor 23 in the display device 100, and the control circuit 18 reduces or blocks the output from the light source 19 on the basis of the detection result of the sensor 23. An imaging device (e.g., a CCD or a CMOS camera) may be used to detect a person who enters into the projection area, in place of the detection beam 21.

Figure 4:
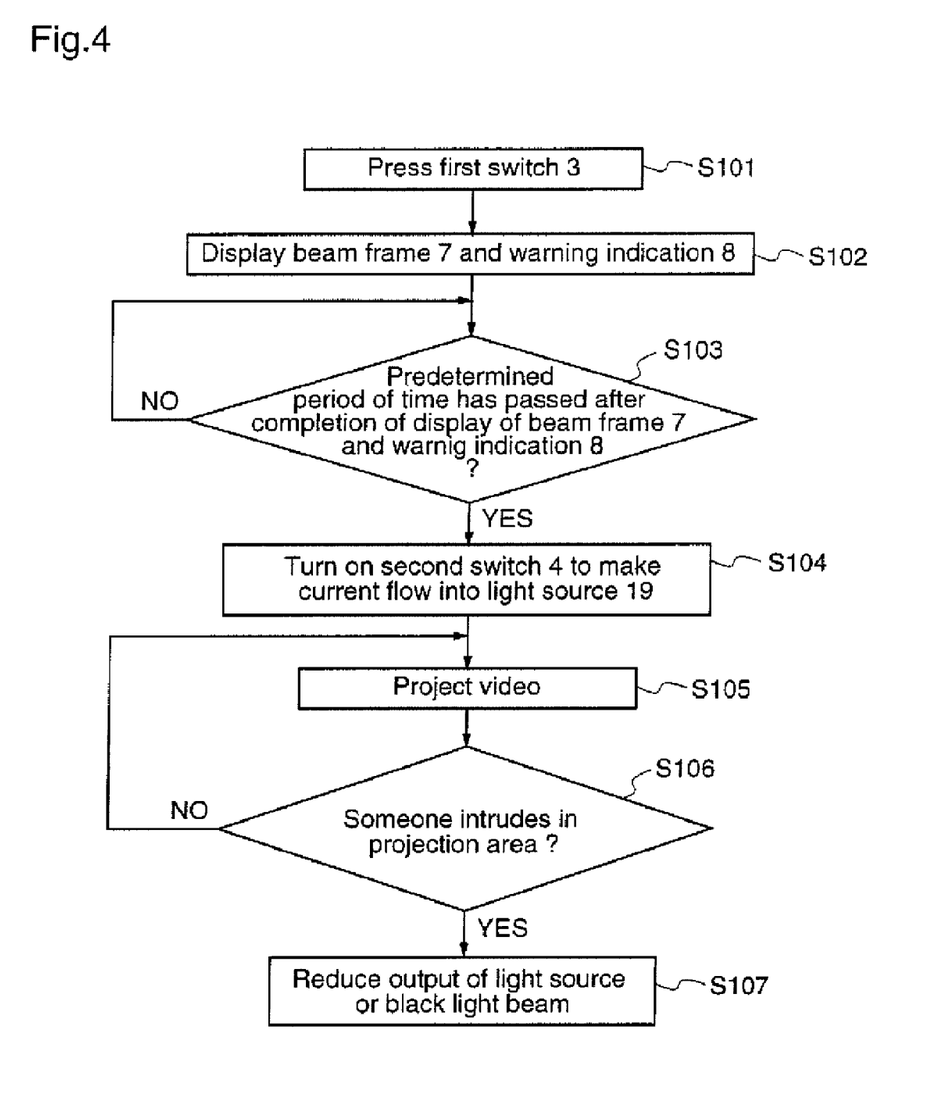
FIG. 4 is a flowchart for explaining the operation of the display device according to the first embodiment.

Hereinafter, a description will be given of the operation of the display device when it displays a guidance including the beam frame 7 and the warning indication 8, with reference to FIG. 4. FIG. 4 is a flowchart for explaining the operation of the display device 100.

First of all, when the first switch 3 is pressed (step S101), a guidance including the beam frame 7 and the warning indication 8 is displayed on the screen 2 from the projection lens 5 (step S102). Next, the control circuit 18 determines whether a predetermined period of time has passed or not (step S103), and makes current flow into the light source 19 by turn-on of the second switch 4, when it is determined that the predetermined period has passed (step S104). When the second switch 4 is pressed, the light source 19 is turned on, and video is projected (step S105). During the projection of video, the display device 100 detects entering of a person into the projection area by using the detection beam 21 (step S106). If entering of a person into the projection area is detected in step S106, the control circuit 18 reduces the output from the light source 19 or blocks the light beam (step S107).

Further, the warning indication 8 may be, for example, a guidance which urges the user to check the condition of confirmation for the surroundings of the user, as shown in FIG. 8. In this case, the user sees the warning indication 8 and checks the surrounding circumstances, and selects "YES" by using such as a cursor key provided on the device if there is no person who enters into the projection area. When "YES" is selected, the control circuit 18 makes current flow into the light source 10 by turn-on of the second switch 4. When the second switch 4 is pressed, the light source 19 is turned on and video is projected. The above-mentioned operation further improves reliability to confirmation to the surrounding circumstances of the user.

Figure 5:
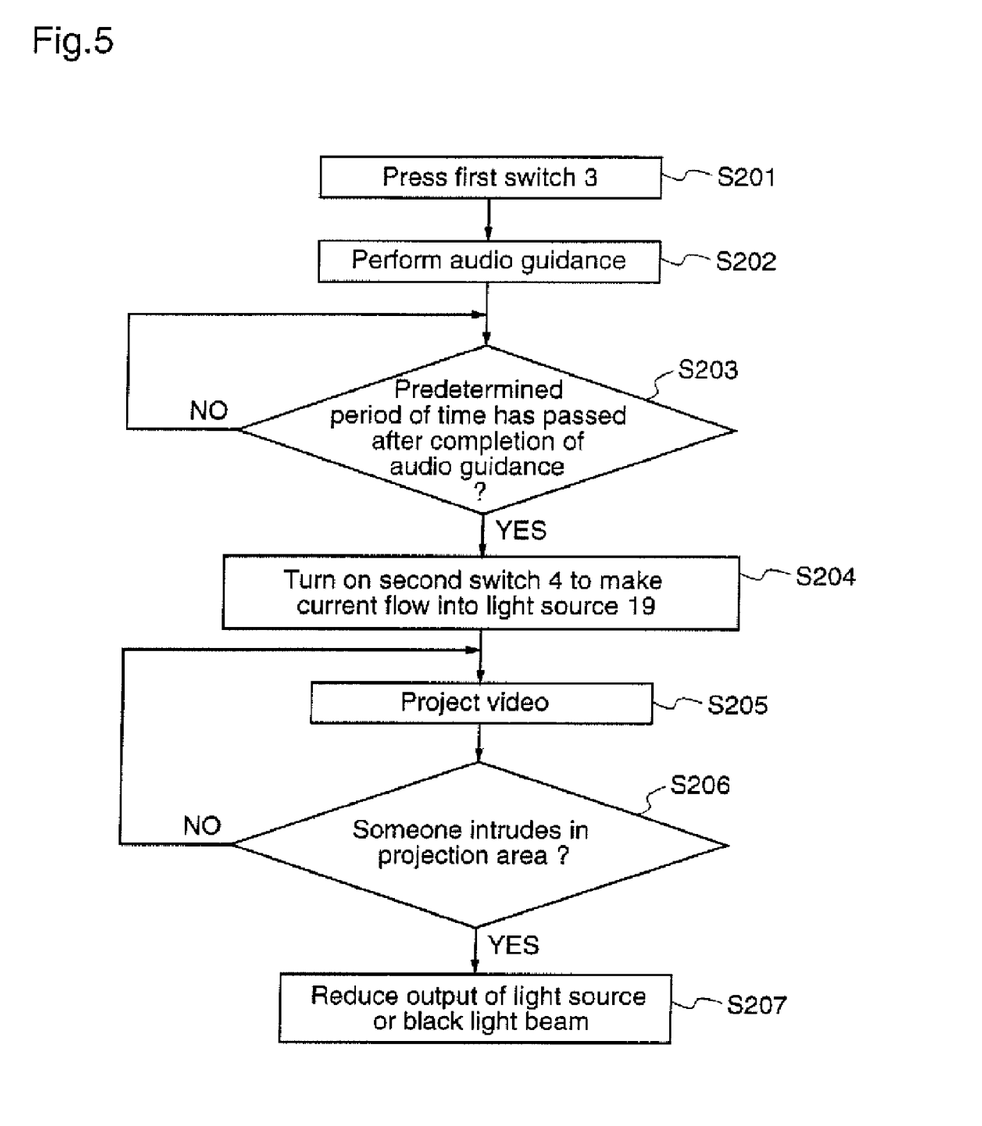
FIG. 5 is a flowchart for explaining the operation of the display device according to the first embodiment.

In addition, when the first switch 3 is pressed, the display device 100 may perform not only display of the guidance including the beam frame 7 and the warning indication 8 but also a guidance by audio. FIG. 5 is a flowchart for explaining the operation of the display device when a guidance by audio is carried out.

First of all, when the first switch 3 is pressed (step S201), an audio means (not shown) performs an audio guidance warning to be cautious of the video projection, under control of the control circuit 18 (step S202). Next, after the audio guidance is completed, the control circuit 18 determines whether a predetermined period of time has passed or not (step S203), and makes current flow into the light source 19 by turn-on of the second switch 4, when the predetermined period of time has passed (step S204). When the second switch 4 is pressed, the light source 19 is turned on, and video is projected (step S205). During the projection of video, the display device 100 detects entering of a person by the detection beam 21 (step S206). If entering of a person into the projection area is detected in step 206, the control circuit reduces the output from the light source 19 or blocks the light beam (step S207).

As described above, since a guidance warning to be cautious of the video projection is outputted by audio, it is possible to urge the user or viewer to confirm whether there is a person who enters into the projection area or not. Further, since no current flows into the light source 19 even if the second switch 4 is pressed unless the predetermined period of time has passed after the audio guidance was completed, a period of time during which the surrounding viewer can get out of the projection area is preferably secured.

Figure 6:
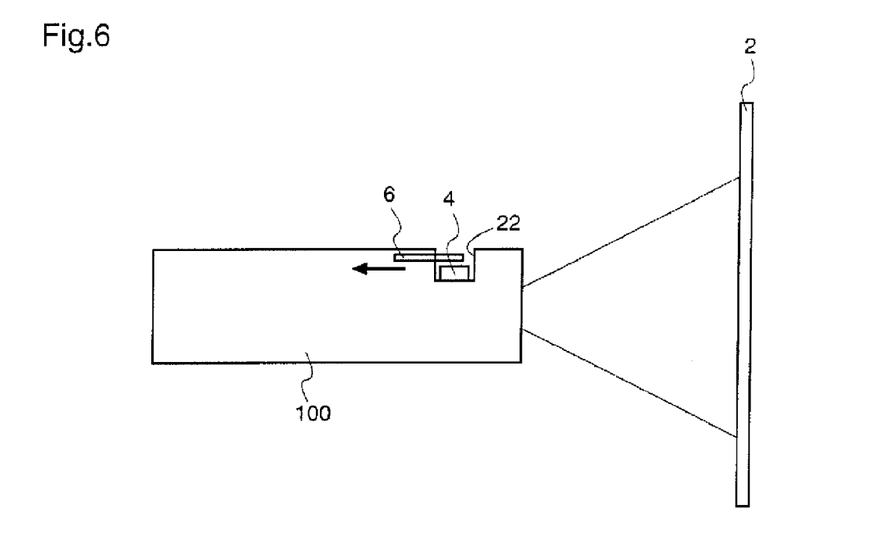
FIG. 6 is a cross-sectional view of the display device according to the first embodiment.

Next, a description will be given of the setting states of the first switch 3 and the second switch 4 of the display device 100, with reference to FIGS. 1 and 6. FIG. 6 is a cross-sectional view of the display device.

The display device 100 has a concave portion 22 at the upper surface of its casing, and the first switch 3 and the second switch 4 are disposed in the concave portion 22. Since the switches are thus disposed, it is possible to reduce the situation where the switches are inadvertently pressed and thereby the light source 19 is undesirably turned on when the display device 100 is carried or taken out of a bag, as compared to the case where these switches are disposed on the surface of the casing. Further, when the second switch 4 is covered with a shutter 6, erroneous irradiation or unnecessary lighting can be prevented with higher reliability. In the display device 100 according to the first embodiment, when the first switch 3 is pressed, the shutter 6 slides to be stored in the display device 100, and thereby the second switch 4 is exposed. Since the second switch 4 is covered with the shutter 6 until the first switch 3 is pressed, inadvertent turn-on of the second switch 4 can be prevented by the shutter 6. Thus, since the second switch 4 is covered with the shutter 6, probability of unnecessary turn-on of the light source 19 is significantly reduced.

As described above, according to the display device 100 of the first embodiment, the first switch 3 and the second switch 4 are disposed on the upper surface of the casing, and the control circuit 18 for controlling the whole display device and the light source 19 are disposed inside the device. The light source 19 is turned on when the second switch 4 is pressed after a predetermined period of time has passed from when the first switch 3 was pressed. Therefore, the user or viewer is given a time for confirming whether there is a person into the projection area or not before projection of video, whereby entering of a person into the projection area is prevented before projection of video, and a person is prevented from being irradiated with the projected light. As a result, it is possible to prevent a person from feeling discomfort due to the projected light.

Further, in the display device 100 according to the first embodiment, the first switch 3 and the second switch 4 are disposed in the concave portion 22, and the second switch 4 is covered with the shutter 6. Therefore, the switches are prevented from being pressed inadvertently, thereby preventing erroneous irradiation of the projected light to a person. Further, when the display device can be battery-driven, unnecessary consumption of the battery is avoided.

While the display device 100 according to the first embodiment has two switches, it is obvious that the device 100 may have more than two switches.

Further, the display device according to the first embodiment may be provided with one switch, and the light source 19 may be turned on when the switch is again pressed after a predetermined period of time has passed from when the switch was once pressed.

Further, while the display device of the first embodiment is provided with the shutter 6 that covers the second switch 4, the device may be provided with a shutter that covers both the first switch 3 and the second switch 4. When the number of switches is more than two, the number of shutters can be optimized according to the number of switches.

Embodiment 2

Figure 7:
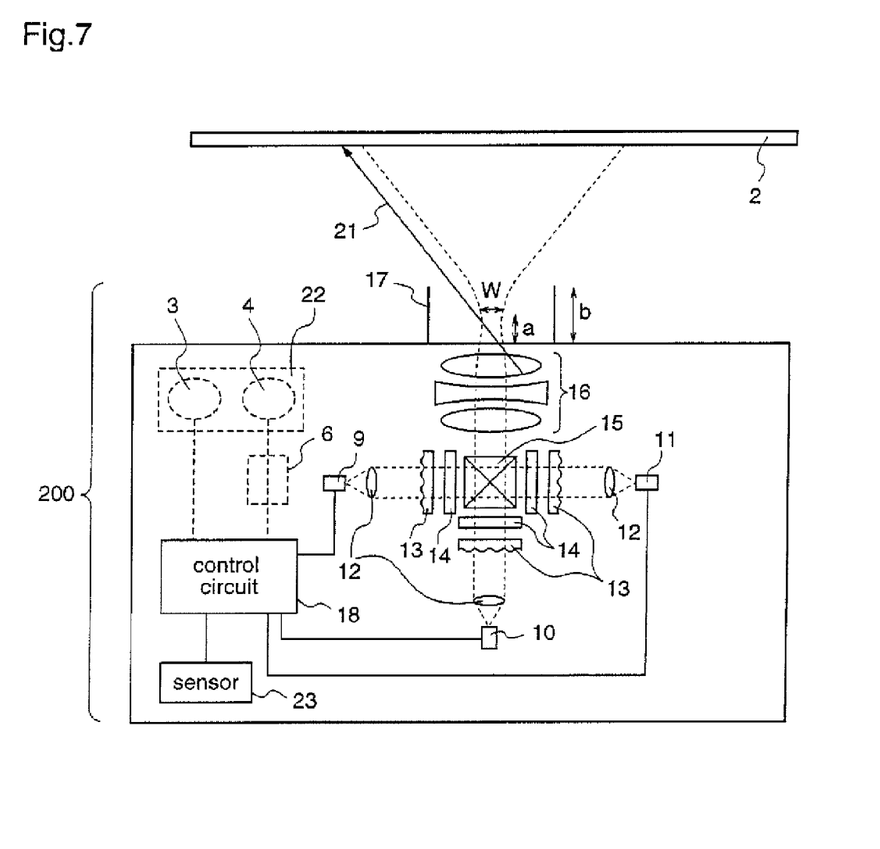
FIG. 7 is a diagram illustrating an example of a constitution of a display device according to a second embodiment.

FIG. 7 is a diagram illustrating an example of a constitution of a display device according to a second embodiment. In FIG. 7, the display device 200 according to the second embodiment includes red (R), green (G), and blue (B) light sources 9 to 11, a lens 12, a light quantity equalization device 13, a two-dimensional spatial modulator 14, a multiplexing prism 15, and a projection lens 16, and further, it includes a hood 17 in the vicinity of the projection lens 16.

Hereinafter, the hood 17 will be explained in detail.

A beam width w of light projected from the projection lens 16 once narrows after being emitted from the display device 200, and then broadens as being closer to the screen. When there is a person who enters in a position where the beam width is broad, i.e., a position close to the screen, the person does not feel dazzled very much because the density of the light beam is low. However, if the person enters in a position where the beam width w is narrower, the person feels dazzled more and thereby his/her discomfort increases. A position where the person feels dazzled most is a position where the beam width w is narrowest, i.e., a position where the beam density is highest. The person feels the most discomfort when light gets into his/her eyes in this position. Therefore, the display device 200 according to the second embodiment is provided with the hood 17 to prevent light from getting into the person's eyes in this position. Assuming that the distance from the casing of the display device 200 to the position where the beam width w becomes narrowest is a, a length b of the hood 17 satisfies b>a.

The display device 200 has a first switch 3 and a second switch 4 that is a switch for turning on the light sources 9 to 11 on an upper surface of its casing, and contains a control circuit 18 for controlling the whole display device inside the casing. The hood 17 is set when the first switch 3 is pressed. When the control circuit 18 confirms that the hood 17 is set in a predetermined position, it makes current flow into the light sources 9 to 11 by turn-on of the switch 4.

Further, the display device 200 detects a person who enters into the projection area by using a detection beam that is infrared light. When there is a person who enters into the projection area and the detection beam is reflected by the person, the reflected light is detected by a sensor 23 in the display device 200, and the control circuit 18 reduces or blocks the outputs from the light sources 9 to 11 on the basis of the detection result of the sensor 23.

Hereinafter, the operation of the display device 200 constituted as described above will be explained.

First of all, when the first switch 3 is pressed, the hood 17 is set in a position in the vicinity of the projection lens at the surface of the casing. For example, when the first switch 3 is pressed, the hood 17 housed in the display device 200 is protruded from the position in the vicinity of the projection lens 16 at the surface of the casing. When the control circuit 18 confirms that the hood 17 is set in the predetermined position, it makes current flow into the light source 19 by turn-on of the second switch 4.

When the second switch 4 is pressed, the light sources 9 to 11 are turned on. Beams emitted from the light sources 9 to 11 are transmitted through the lens 12, the light quantity equalization device 13, and the two-dimensional spatial modulator 14, and multiplexed by the multiplexing prism 15. The multiplexed light is guided to the projection lens 16, and projected on the screen 2 from the projection lens 16.

During the projection of video, the display device 200 detects entering of a person into the projection area by using the detection beam 21. When entering of a person is detected, the control circuit 18 reduces the output from the light source 19 or blocks the light beam.

As described above, in the display device 200 according to the second embodiment, when the first switch 3 is pressed, the hood 17 having a length longer than a distance from the surface of the casing of the display device 200 to a position where the beam width w of the projected light becomes narrowest is set in the vicinity of the projection lens 16 at the surface of the casing. When the second switch 4 is pressed after the control circuit 18 confirms that the hood 17 is set in a predetermined position, the light sources 9 to 11 are turned on. Therefore, even when a person enters into the projection area during projection of video, the hood 17 prevents the light having the narrowest beam width from getting into the eyes of the person, thereby preventing the person from feeling dazzled and discomfort.

Further, the display device 200 according to the second embodiment may be provided with a hood attachment part to which the hood 17 is detachably attached, at the surface of the casing in the vicinity of the projection lens 16, and current may be flowed into the light sources 9 to 11 by turning on the second switch 4 after the control circuit 18 confirms that the hood 17 is attached to the food attachment part.

Furthermore, in the display device 200 according to the second embodiment, when the first switch 3 is pressed, a guidance including a beam frame 7 and a warning indication 8 may be displayed on the screen 2, or an audio guidance warning to be cautious of video projection may be carried out.

APPLICABILITY IN INDUSTRY

A display device according to the present invention is useful as a device for displaying video on a screen.

The invention claimed is:

1. A display device for projecting video by emitting light, said device comprising:
   a light source;
   a prevention means comprising at least one switch for controlling turn-on of the light source in two or more stages for controlling said switch within a predetermined period of time, thereby preventing entering of a person into a projection area before projection of video by projecting a frame indicating a projection area.

2. A display device as defined in claim 1 further including:
   a detection means for detecting entering of a person into the projection area, and
   a means for controlling an output of light projected from the light source when the detection means detects entering of a person into the projection area.

3. A display device as defined in claim 1 further including:
   a concave portion at an upper surface of a casing of the display device,
   said switch being located in the concave portion.

4. A display device as defined in claim 1 further including a shutter that covers the switch.

5. A display device as defined in claim 1 wherein said prevention means comprises at least two said switches.

6. A display device as defined in claim 5 wherein said prevention means comprises a first switch and a second switch, for turning on the light source when the second switch is pressed a predetermined period of time after the first switch was pressed.

7. A display device as defined in claim 1 wherein said prevention means has one said switch, for turning on the light source when the switch is again pressed a predetermined period of time the switch was earlier pressed.

8. A display device as defined in claim 1 wherein
   said prevention means is for preventing a person from entering into the projection area before projection of video, and a displaying guidance display indicating the projection area and a warning display for urging confirmation of surrounding circumstances, on a screen on which video is projected, and for turning on the light source of the display device by a second switch control, a predetermined period after display of the guidance was ended.

9. A display device as defined in claim 8 further including a two-dimensional spatial modulation element having plural cells, for modulating light emitted from the light source,
   wherein the cells are positioned in the vicinity of an outermost circumference of the two-dimensional spatial modulation element for indicating the projection area.

10. A display device as defined in claim 8 for indicating a projection area is larger than a projection area of video that is projected after the second switch control.

11. A display device as defined in claim 8 wherein the guidance including the display indicating the projection area and the warning display are in green light.

12. A display device as defined in claim 11 wherein a range of green of the green light is $X<0.3, Y\geqq0.6$ on an xy chromaticity diagram of CIE.

13. A display device as defined in claim 11 wherein said green light is coherent light, and its output is equal to or lower than class 2 of the laser safety standard that is defined by the International Electrotechnical Commission.

14. A display device as defined in claim 1 wherein said prevention means additionally is for providing an audio guidance warning to be cautious of video projection, by a first switch control, and a second switch control for turning on the light source a predetermined period of time after the audio guidance was ended.

15. A display device as defined in claim 1 wherein said prevention means additionally comprises a hood in the vicinity of a projection lens and controlled by the first switch control, and the light source of the display device is turned on by the second switch control after the hood is confirmed to be in a predetermined position.

16. A display device as defined in claim 1 further including a hood attachment part, which is in the vicinity of a projection lens on an upper surface of a casing, and to which a hood is detachably attached,
wherein the light source is turned on by the switch control after the hood is confirmed to be attached to the hood attachment part.

17. A display device as defined in claim 15 wherein the length of the hood in the projection direction is longer than a distance from the surface of the casing to a position where the beam density of the light emitted from the projection lens becomes maximum.

18. A display device as defined in claim 16 wherein the length of the hood in the projection direction is longer than a distance from the surface of the casing to a position where the beam density of the light emitted from the projection lens becomes maximum.

* * * * *